M. A. HUGHES.
MOTOR SLED.
APPLICATION FILED JUNE 4, 1917.
1,251,530.
Patented Jan. 1, 1918.
2 SHEETS—SHEET 1.
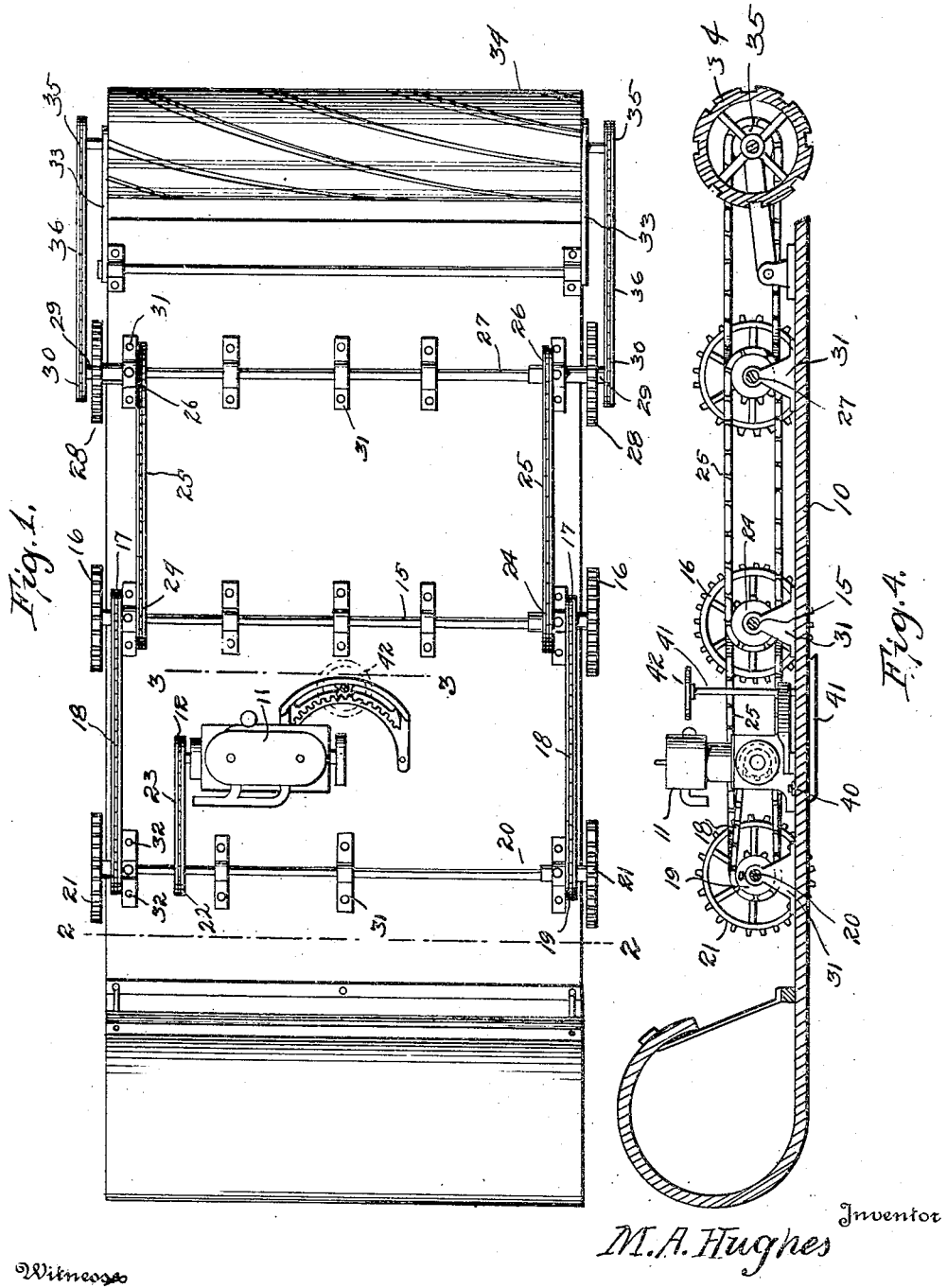
M. A. Hughes, Inventor M. A. HUGHES.
MOTOR SLED.
APPLICATION FILED JUNE 4, 1917.
1,251,530.
Patented Jan. 1, 1918.
2 SHEETS—SHEET 2.
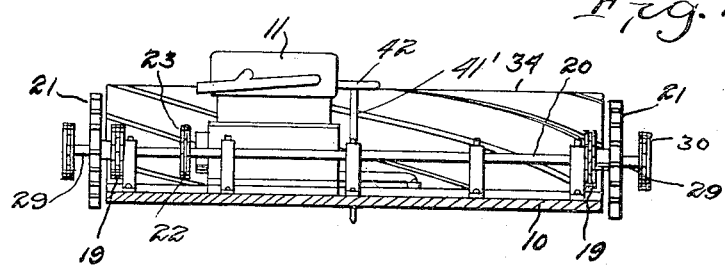
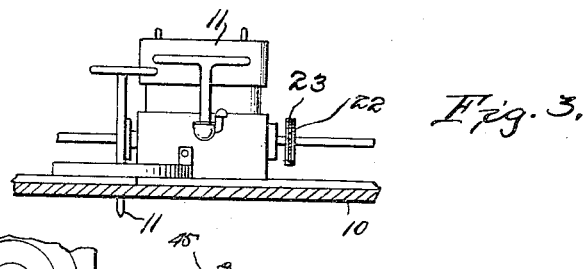
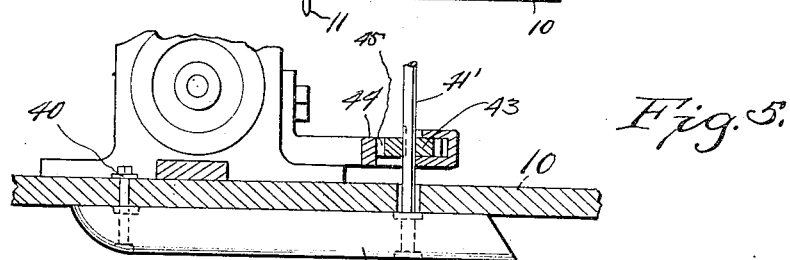
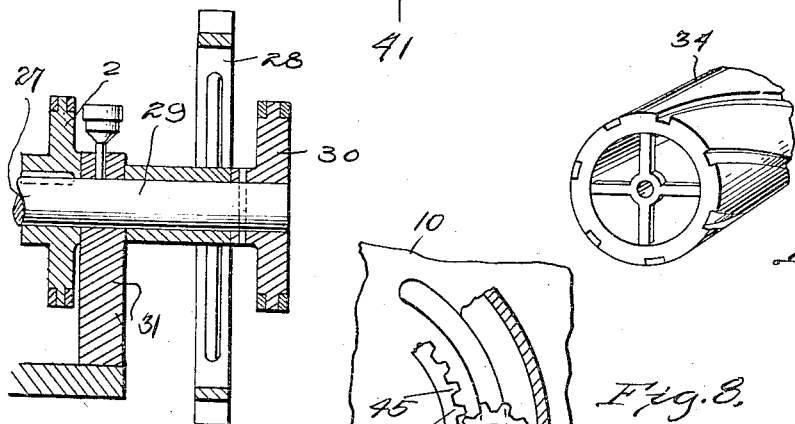
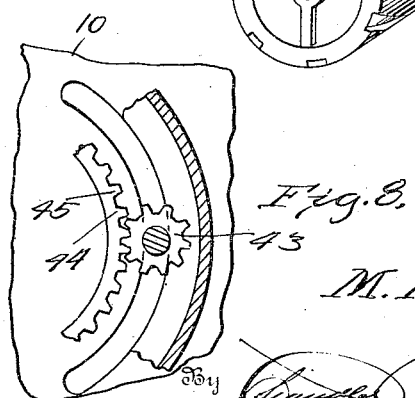
Inventor
M. A. Hughes
Witnesses
By
Attorneys

UNITED STATES PATENT OFFICE.

MARION A. HUGHES, OF BENKELMAN, NEBRASKA.

MOTOR-SLED.

1,251,530.  Specification of Letters Patent.  Patented Jan. 1, 1918.

Application filed June 4, 1917. Serial No. 172,753.

*To all whom it may concern:*

Be it known that I, MARION A. HUGHES, a citizen of the United States, residing at Benkelman, in the county of Dundy, State of Nebraska, have invented certain new and useful Improvements in Motor-Sleds; and I do hereby declare the following to be a full, clear, and exact description of the invention, such as will enable others skilled in the art to which it appertains to make and use the same.

This invention relates to new and useful improvements in motor sleds, and has for its primary object to provide a device of this character with means by which it may be propelled.

A further object of the invention is to provide a device of this character which is simple in construction and operation.

Referring to the drawings,

Figure 1, is a top plan view of the device,

Fig. 2, is a transverse sectional view on the line 2—2 of Fig. 1,

Fig. 3, is a transverse sectional view on the line 3—3 of Fig. 1,

Fig. 4, is a longitudinal sectional view,

Fig. 5, is a detail view of the steering mechanism,

Fig. 6, is a detail view of one of the rear driving shafts,

Fig. 7, is a detail view of the rear driving wheel, and,

Fig. 8 is a detail view showing the method of mounting the steering wheel.

Referring more particularly to the drawings, the reference character 10 designates a sled which is preferably of the toboggan type, and it is this type of sled to which the present invention is particularly adapted.

Mounted substantially centrally of the sled is a motor 11 which is preferably of the internal combustion type, and said internal combustion motor is so positioned that its shaft extends in a plane at right angles to the longitudinal axis of the sled, and said shaft is provided near its end with a sprocket 12.

Mounted substantially centrally of the toboggan 10 and extending transversely thereof is a shaft 15 upon the opposite ends of which are mounted traction wheels 16, said traction wheels being connected to the shaft 15 in such a manner that they are caused to rotate therewith. The shaft 15 is also provided near each of its ends with a sprocket wheel 17 and extending around said sprocket wheels 17 are chains 18 which extend forwardly of the toboggan and pass around sprocket wheels 19 carried by the transversely extending shaft 20 on the opposite ends of which are mounted traction wheels 21 which are similar in construction to the traction wheels 16. This forward shaft 20 is provided with a sprocket 22 and passing around said sprocket 22 and around the sprocket on the crank shaft of the engine is a chain 23, this chain 23 providing means by which the forward shaft 20 is driven from the motor 11, and the chains 18 forming the means by which the shaft 15 is driven from the forward shaft 20.

The central shaft 15 is also provided near each of its ends with sprocket wheels 24, and extending rearwardly from said shaft and passing around said sprocket wheels 24 is a chain 25 which also passes around sprocket wheels 26 which are carried by a rear shaft 27 the opposite ends of which are provided with traction wheels 28 which are of the same construction as the traction wheels 16 and 21. This rear shaft 27, however, is extended beyond the sides of the toboggan as at 29 and on said extended ends are keyed sprockets 30 the purpose of which will be hereinafter set forth. Each of the shafts 15, 20, and 27 are mounted in suitable bearings 31 which are secured to the bottom of the toboggan by bolts 32.

Pivotally mounted near the rear ends of the toboggan and extending rearwardly thereof are links 33, and rotatably mounted in the rear ends of the links 33 is a traction roller 34 which extends throughout the entire width of the toboggan, and carried on the shaft of said roller 34 at opposite ends thereof are sprocket wheels 35. Passing around these sprocket wheels 35 and the sprocket wheels 30 are chains 36, said chains forming the means by which the rear traction roller 34 is driven.

From the foregoing it will be seen that when the motor 11 is started, the forward shaft 20 is rotated by means of the chain 23, and said shaft through the medium of the chains 18 serves to drive the central shaft 15, said shaft through the medium of the chains 25 driving the rear shaft 27 and said shaft through the medium of the chains 36 serving to drive the rear traction roller 34. By reason of the links 33 being pivotally connected to the toboggan, it will be seen that the rear traction roller 34 is capable of adapting itself to any inequalities in the road in such a manner that it will always lie in contact with the road surface.

Pivoted as at 40 is a rudder 41, to the rear end of which is rotatably secured a vertically extending standard 41' which is provided with a hand wheel 42. This standard 41' is provided with a gear wheel 43 which is adapted to mesh with a crescent shaped segment 44 the inner edge of which is provided with a set of gear teeth 45. Upon rotation of the vertical standard 41 in its bearing 46 it is apparent that the rudder 41 will be moved out of a plane in alinement with the longitudinal axis of the toboggan to serve to steer the same, said rudder being moved by reason of the gear wheel 43 engaging the teeth 45 of the crescent shaped segment 44.

Having thus described the invention, what is claimed, is:

1. A device of the character described comprising in combination, a toboggan, a plurality of shafts extending transversely of said toboggan, traction wheels mounted on the opposite ends of each of said shafts, sprocket wheels carried by said shafts, chains connecting said sprocket wheels, a sprocket wheel secured to one of said shafts intermediate of its ends, and means for driving said last mentioned sprocket wheel to rotate all of said shafts.

2. A device of the character described comprising in combination, a toboggan, a motor carried by the toboggan, a shaft extending transversely of the forward portion of said toboggan, a sprocket secured to said shaft intermediate of its ends, a chain connecting said sprocket with said motor, a traction wheel carried by each end of said shaft, a sprocket carried by the shaft adjacent each of said traction wheels, a plurality of shafts extending transversely of the toboggan, traction wheels carried by each of said shafts, sprocket wheels carried by each of said shafts, chains connecting one of said shafts with the first mentioned shaft, chains connecting said shafts to each other, a traction roller pivotally supported by the rear end of the toboggan, and means connecting one of the last mentioned shafts with said traction roller for driving the latter.

3. A device of the character described comprising in combination, a toboggan, a motor carried by said toboggan, a plurality of transversely extending shafts rotatably mounted on the toboggan, traction wheels carried by the opposite ends of said shafts, a traction roller pivotally mounted on the rear end of said toboggan, and means for driving said traction wheels and said traction roller.

In testimony whereof, I affix my signature in the presence of two witnesses.

MARION A. HUGHES.

Witnesses:
NORA S. SCHMIDT,
F. R. WALKER.

Copies of this patent may be obtained for five cents each, by addressing the "Commissioner of Patents, Washington, D. C."